United States Patent [19]

Illy

[11] Patent Number: 4,748,030
[45] Date of Patent: May 31, 1988

[54] PROCESS FOR TREATING ROASTED COFFEE

[76] Inventor: Ernesto Illy, Via Flavia, 110, I-34147 Trieste, Italy

[21] Appl. No.: 935,395

[22] Filed: Nov. 26, 1986

Related U.S. Application Data

[63] Continuation-in-part of Ser. No. 844,233, Mar. 24, 1986, abandoned, which is a continuation-in-part of Ser. No. 479,956, Mar. 29, 1983, abandoned.

[30] Foreign Application Priority Data

Apr. 27, 1982 [IT] Italy ............................ 20950 A/82
Aug. 4, 1986 [EP] European Pat. Off. ........ 86830227.4

[51] Int. Cl.$^4$ ........................ A23F 5/10; A23F 5/02; A01J 11/00
[52] U.S. Cl. .................................. 426/233; 426/486; 426/595; 99/468
[58] Field of Search ............... 426/231, 486, 233, 232, 426/507, 312, 316, 319, 318, 395, 392, 397, 394, 410, 402, 418, 416, 419, 594, 413, 595, 598, 443, 486, 404, 629, 650, 466, 468; 53/432; 99/467–468, 472

[56] References Cited

U.S. PATENT DOCUMENTS 3,333,963 8/1967 Moon et al. ...................... 426/486
3,506,446 4/1970 Champion ........................... 426/397

FOREIGN PATENT DOCUMENTS

0853634 10/1970 Canada .

Primary Examiner—Raymond N. Jones
Assistant Examiner—Marianne M. Cintins
Attorney, Agent, or Firm—Peter K. Kontler

[57] ABSTRACT

Roasted coffee beans are delivered to an airtight container. The container is purged with $CO_2$ or $N_2$ until the $O_2$ concentration is between 0.2 and 2%. The container is then sealed and the coffee beans are aged under an atmosphere consisting of $CO_2$ or $N_2$ with small amounts of $O_2$. During the aging process, which involves a liberation by the coffee beans of a gas rich in $CO_2$, the pressure in the container is maintained between 0.4 and 1.8 atmospheres. Aging may take place at temperatures between 20° and 25° C. and, under such circumstances, the $O_2$ concentration in the container is maintained within the range of 0.2 to 1% throughout the aging period. The aging period at these temperatures is between 15 days and 31 days. Alternatively, aging may take place at temperatures between 30° and 50° C. The $O_2$ concentration in the container is then maintained within the range of 0.2 to 2% throughout the aging period which is now only 4 to 10 days.

23 Claims, 3 Drawing Sheets

PROCESS FOR TREATING ROASTED COFFEE

CROSS-REFERENCE TO RELATED APPLICATIONS

This application is a continuation-in-part of application Ser. No. 844,233 filed Mar. 24, 1986, now abandoned, which, in turn, is a continuation-in-part of application Ser. No. 479,956 filed Mar. 29, 1983 and now abandoned.

BACKGROUND OF THE INVENTION

The invention relates generally to a process and arrangement for treating roasted coffee, especially roasted coffee beans.

More particularly, the invention relates to a process and arrangement for treating roasted coffee which, after treatment and grinding, is packaged in packets for ultimate use in coffee brewing machines.

Industrially roasted coffee should be well packed so as to maintain, for as long as possible, those properties which make brewed coffee palatable. It is well known that, soon after coffee is roasted, it begins to generate gas having a high percentage of carbon dioxide and that such gas evolution may continue for weeks. It is also known that, if the coffee is not properly treated and/or packaged, some of the coffee's aromatic volatile substances are lost with the gas. On the one hand, then, it is advisable to pack the coffee in sealed bags soon after roasting so as to prevent the loss of aromatic substances. On the other hand, the gas evolution makes it inadvisable to immediately package the freshly roasted coffee in sealed bags since the gas could produce too high a pressure in the bags.

In current processes for the treatment of coffee, the roasted coffee is allowed to liberate gas before being packaged. During this procedure, care must be taken to prevent escape of the aromatic substances from the coffee and to prevent oxidation of the aromatic substances by the oxygen in the air since this affects the quality of the aromatic substances. Thus, the roasted coffee is generally allowed to stand in airtight containers under controlled pressure with the liberated gas being removed by blowing inert gas into the containers. Such a procedure is described, for example, in the Canadian Patent No. 853,634. According to the Canadian patent, roasted coffee is permitted to liberate gas in airtight containers and the liberated gas is evacuated by blowing a purging gas into the containers in a controlled manner such that the pressure inside the containers is lower than atmospheric pressure but higher than the vapor pressure of at least the majority of the volatile constituents of the coffee. This procedure is relatively rapid. If the coffee is to be packaged in the form of beans, it is left in the containers for 4 or 5 days after which it is removed and packed in airtight packages under an inert gas atmosphere. On the other hand, if the coffee is ground before it is placed in the containers, the coffee is permitted to remain in the containers for only a few hours.

The foregoing procedure has the drawback that the brewed coffee does not have a fully satisfactory taste.

OBJECTS AND SUMMARY OF THE INVENTION

It is an object of the invention to provide a process for the treatment of roasted coffee which enables brewed coffee of improved taste to be obtained.

Another object of the invention is to provide a process for the treatment of roasted coffee which allows the loss of aromatic substances to be kept relatively low.

An additional object of the invention is to provide a process for the treatment of roasted coffee which makes it possible to achieve good transfer of the aromatic substances to the brewed coffee.

A further object of the invention is to provide a process for the treatment of roasted coffee which may be performed relatively rapidly yet is capable of yielding a quality product.

It is also an object of the invention to provide a process for the treatment of roasted coffee which may be carried out relatively simply.

A concomitant object of the invention is to provide a process for the treatment of roasted coffee which can generate a product of relatively consistent quality.

Yet another object of the invention is to provide roasted coffee of improved quality.

An additional object of the invention is to provide roasted coffee which, when contacted with water, yields a beverage of improved taste.

Still a further object of the invention is to provide an arrangement for the treatment of roasted coffee which allows the loss of aromatic substances to be held to relatively low levels.

It is yet another object of the invention to provide an arrangement for the treatment of roasted coffee which makes it possible to achieve good relatively efficient transfer of the aromatic substances to the brewed coffee.

An additional object of the invention is to provide an arrangement for the treatment of roasted coffee which enables brewed coffee of improved taste to be obtained.

A concomitant object of the invention is to provide an arrangement for the treatment of roasted coffee which makes it possible to produce a quality product relatively quickly.

Still another object of the invention is to provide a relatively simple arrangement for the treatment of roasted coffee.

It is a further object of the invention to provide an improved substitute for conventional apparatus which are used to treat roasted coffee.

The preceding objects, as well as others which will become apparent as the description proceeds, are achieved by the invention.

One aspect of the invention resides in a process for treating roasted coffee, particularly roasted coffee in the form of beans. The process comprises the following steps:

A. Admitting the roasted coffee into at least one aging chamber, preferably an airtight chamber.

B. Establishing an $O_2$ concentration between about 0.2 and about 2% in the aging chamber.

C. Aging the coffee in the chamber for an aging period of about 4 days to about 21 days. The aging step includes maintaining the pressure in the chamber below about 1.8 atmospheres throughout at least the major part of the aging period, and maintaining the $O_2$ concentration in the chamber between about 0.2 and 2% throughout at least the major part of the aging period.

During the aging step, the coffee liberates gas having a high concentration of $CO_2$.

The establishing step may include removing most of the air from the aging chamber by introducing into the chamber a protective gas which is essentially inert with respect to the aromatic substances in the coffee. The protective gas is advantageously $CO_2$ or $N_2$. Once most of the air has been removed from the aging chamber, the pressure in the chamber is preferably established at an initial value of at least 0.4 atmosphere and is controlled so as not to exceed about 1.8 atmospheres throughout the aging period.

It is possible to purge the aging chamber with a first protective gas which is essentially inert with respect to the aromatic substances in the coffee and to then purge the chamber with a second protective gas which is likewise essentially inert with respect to the aromatic substances. The aging step is then performed under an atmosphere consisting predominantly of the second protective gas with 0.2 to 2% $O_2$ and, possibly, residual amounts of the first protective gas. In the event that the aging chamber is purged with two protective gases, it is preferred for the first protective gas to be $CO_2$ and for the second protective gas to be $N_2$.

The coffee beans may be stabilized subsequent to the aging step. This involves an adjustment of the moisture content of the coffee, usually an increase in moisture content. Stabilization may be accomplished in an open or air-permeable stabilization or adjusting chamber. The coffee beans may be allowed to simply stand in the stabilization chamber until the moisture content of the coffee is in equilibrium with the moisture content of the ambient air. However, it is also possible to pass humidified air through the coffee. Once stabilization has been effected, the coffee is immediately ground and packaged. The stabilizing step may require up to several hours.

As an exemplary description of the process of the invention, roasted coffee beans are delivered to one or more aging chambers until each chamber is 90–95% full. A stream of $CO_2$ or $N_2$ is then blown into the lower end of each chamber until the $O_2$ concentration is between 0.2 and 2%. Alternatively, an $O_2$ concentration of 0.2 to 2% is achieved by first blowing in $CO_2$ and then blowing in $N_2$. Once an $O_2$ concentration of 0.2 to 2% has been obtained, the chambers may be sealed.

After the aging chambers have been sealed, the coffee is under an atmosphere consisting essentially of $CO_2$ or $N_2$ with residual $O_2$ from the air. The coffee is now aged in the chambers for a period which, depending upon the conditions, may last from 4 days to 31 days. During the initial part of the aging period, the pressure in the chambers is established at a value of at least 0.4 atmosphere. If the initial pressure established in the aging chambers is below 1.0 atmosphere, the pressure tends to spontaneously increase to this or a greater value. Once the pressure reaches 1.0 atmosphere, it is advantageously maintained between 1.0 and 1.8 atmospheres for the remainder of the aging period. Safety valves may be employed to prevent the pressure from inadvertently exceeding 1.8 atmospheres. The maximum pressure of 1.8 atmospheres is preferred since it produces good results and presents few technical problems, i.e., problems related to seals, sizing of components, etc.

The atmosphere in each aging chamber is continuously or periodically analyzed during the aging step. This is accomplished by measuring the ratio $O_2/CO_2$ or $O_2/N_2$ depending upon whether $CO_2$ or $N_2$ was present in the aging chambers upon sealing the latter. If $CO_2$ was initially blown into the aging chambers during the removal of air therefrom and $N_2$ was subsequently substituted for the $CO_2$, the ratio $O_2/CO_2$ is measured during the initial purging of the aging chambers while the ratio $O_2/N_2$ is measured during the later stages of purging as well as during the actual aging step. Analysis of the atmospheres in the aging chambers may be performed using a single gas analyzer which cyclically samples the gas in the various chambers. Alternatively, each aging chamber may be provided with its own gas analyzer. The percentage of $O_2$ in each aging chamber is maintained within the range of 0.2 to 2% either manually or automatically based upon analysis of the atmosphere. If the ratio $O_2/CO_2$ or $O_2/N_2$ is too high, the ratio may be adjusted as required by blowing in additional $CO_2$ or $N_2$.

When the aging step is complete, the aged coffee beans are admitted into one or more stabilization or adjusting chambers in order to adjust the moisture content thereof. Typically, aged coffee is extremely dry and, if ground immediately, would present difficulties in obtaining granules of proper size. The reason is that the friability of the coffee beans will change rapidly as these absorb moisture from, and undergo gas exchange with, the air. By permitting the aged coffee beans to stand in contact with the air for up to several hours and, if necessary, blowing humidified air through the coffee beans, the latter are stabilized, particularly as regards the moisture content thereof.

An important, experimentally established advantage of the process according to the invention is that it yields a product of consistent quality in which the aromatic substances have a high degree of solubility in water so that efficient transfer of the aromatic substances to brewed coffee may be achieved. Due to the characteristics of the coffee produced by the process of the invention, control of the coffee during packaging may be reduced or eliminated.

In accordance with one embodiment of the process, the aging step is carried out at room temperature. The temperature here will generally lie between 20° and 25° C. The aging period at such temperature may range from 15 days to 4 months but is preferably between 15 and 21 days. Moreover, the $O_2$ concentration in the aging chamber or chambers when the aging step is performed at room temperature is favorably maintained between 0.2 and 1% and, particularly advantageously, between 0.4 and 0.5%.

According to another embodiment of the process, the coffee is maintained at a temperature of at least 30° C. during the aging step. As compared to aging at room temperature, it has been found that this not only enables the duration of the aging step to be reduced but can also lead to an even greater improvement in the quality of the roasted coffee. A reduction in the duration of the aging step permits increased output to be achieved.

The temperature of the coffee is preferably maintained between 30° and 50° C. during the aging step. The $O_2$ concentration in the aging chamber or chambers is maintained within the previously indicated range of 0.2 to 2% when the aging step is carried out at temperatures of 30° C. or above. At these temperatures, the aging period is from 4 days to 10 days. The aging period may be inversely proportional to the aging temperature. For instance, the aging period may be about 10 days at an aging temperature of 30° C.; about 7 days at an aging temperature of 40° C.; and about 4 days at an aging temperature of 50° C.

On the one hand, the physical and chemical changes undergone by the roasted coffee during the aging step are accelerated in the temperature range of 30° to 50° C. thereby allowing the aging period to be reduced. On the other hand, aging in this temperature range permits a product of superior quality to be obtained.

The temperature range of 30° to 50° C. was established by careful research. At the lower end of the range, a significant reduction in the aging period from that at room temperature may be achieved, i.e., a reduction from at least 15 days to 10 days or less. While aging may be performed between room temperature and 30° C., the advantages associated with the accompanying smaller reductions in the aging period only marginally outweigh the increased costs of operating above room temperature. Above the upper limit of 50° C., the rate of gas evolution by the roasted coffee increases to such an extent that an uncontrolled loss of the aromatic substances may occur thereby resulting in a product of poor quality.

Another aspect of the invention resides in an arrangement for treating roasted coffee, particularly roasted coffee beans. The arrangement comprises the following:

A. An aging container.
B. Means for admitting roasted coffee into the aging container.
C. Means for discharging roasted coffee from the aging container.
D. Means for measuring the concentration of $O_2$ in the aging container.
E. Means for sensing the pressure in the aging container.
F. Means for regulating the $O_2$ concentration and the pressure in the aging container.

The aging container is preferably in the form of an elongated vertical silo and is advantageously constructed so as to be airtight.

The means for admitting roasted coffee into the aging container may include a pneumatic conveyor for delivering the coffee to an inlet of the container, and an admitting valve for controlling the supply of coffee to the container. The pneumatic conveyor may be supplied with freshly roasted coffee by another conveyor which extends between the pneumatic conveyor and a roasting plant.

Outlet means may be provided to permit the escape of air from the aging container as roasted coffee is admitted therein, and the outlet means may include an outlet valve. The arrangement of the invention may further comprise a filter for filtering the escaping air before it enters the atmosphere, and a duct or conduit which connects the outlet means with the filter.

The means for discharging roasted coffee from the aging container may include a discharge valve which is disposed at or near the bottom of the container and serves to control the removal of coffee from the latter.

The means for measuring the $O_2$ concentration in the aging container may comprise a gas analyzer. The gas analyzer, which preferably operates automatically, may be designed to analyze or sample the atmosphere inside the container on a periodic or continuous basis. If the arrangement includes more than one aging container, a single gas analyzer may be employed for all of the containers. This analyzer is then arranged to measure the $O_2$ concentration in the various containers cyclically, i.e., the analyzer analyzes the different containers one after the other in a cyclical fashion. Alternatively, each container is provided with its own individual gas analyzer.

The means for sensing the pressure in the aging container may include a pressure gauge.

The means for regulating the $O_2$ concentration and the pressure in the aging container may comprise a source of a pressurized protective gas which is inert with respect to the aromatic substances in the coffee. The source may be connected with a gas inlet of the container via a duct or conduit, and an inlet valve may be provided to control the inflow of gas to the container. The protective gas supplied by the source is preferably $CO_2$ or $N_2$.

The aging container may be connected with more than one source of a pressurized protective gas which is inert with respect to the aromatic substances in the coffee. For example, it is possible to connect the container with both a source of $CO_2$ and a source of $N_2$. A duct or conduit then connects each of these sources with the container, and individual inlet valves are provided to control the flow of the respective gases to the container.

The regulating means may further comprise an exhaust valve for exhausting gas from the aging container, e.g., in the event that the pressure in the container rises above a predetermined value.

The regulating means may also comprise a safety valve for the aging container. Such valve is preferably designed to open at a pressure between 1.0 and 1.8 atmospheres. Pressure relief means may be provided to rapidly reduce the pressure in the container if the safety valve fails to function. It is further possible to provide warning means operative to generate a warning signal when the pressure in the container exceeds a predetermined value.

The arrangement in accordance with the invention may additionally include an adjusting or stabilization container for adjusting the moisture content of the aged coffee discharged from the aging container, and means for transporting the aged coffee from the aging container to the stabilization container. The transporting means may include a first conveyor which receives the aged coffee directly from the aging container, and a second conveyor which accepts the aged coffee from the first conveyor for delivery to the stabilization container. The second conveyor is preferably a pneumatic conveyor.

A dust separator may be disposed between the second conveyor and the stabilization container in order to separate air from the aged coffee. The dust separator may be connected with an air or gas filter by mean of a duct or conduit. This may be the same filter as is connected to the outlet means of the aging container, i.e., the outlet means through which air is evacuated from the aging container during the admission of coffee into the latter. The dust separator is preferably in the form of a centrifugal separator.

The arrangement of the invention may include a plurality of adjusting or stabilization containers and, in such an event, distributing means may be provided for the purpose of distributing the aged coffee arriving from the aging container among the various stabilization containers. The distributing means may comprise a rotary valve arranged to receive roasted coffee from the second conveyor of the transporting means, and a rotary distributor arranged to receive the coffee from the rotary valve. The rotary valve is preferably airtight.

The rotary valve and rotary distributor may be located intermediate the dust separator and the stabilization containers, and the distributing means may further comprise a plurality of ducts or conduits each of which connects one of the stabilization containers to the rotary distributor.

The stabilization containers may be open or air-permeable so that the aged coffee can undergo gas exchange with the ambient air. Generally, the aged coffee will have a lower moisture content than the ambient air and will absorb moisture therefrom thus becoming stabilized.

In order to enhance the absorption of moisture by the aged coffee, each stabilization container may be provided with a gas inlet. Each such gas inlet may be connected to a source of pressurized humidified gas, e.g., pressurized humidified air, by means of a respective duct or conduit and a respective inlet valve for controlling the supply of humidified gas to the associated container. An individual source of humidified gas may be provided for each stabilization container or, alternatively, all of the containers may be connected to a common source of humidified gas.

A discharge valve for controlling the evacuation of stabilized coffee may be provided at or near the bottom of each stabilization container.

The arrangement of the invention may include means for controlling the temperature in the aging container. The controlling means may be designed to bring the roasted coffee admitted into the aging container to a desired aging temperature and to maintain such temperature throughout the aging period.

When the roasted coffee is to be aged at or above 30° C., the controlling means may comprise heating means. The heating means may include a source of heated fluid, and the source is preferably designed to permit regulation of the fluid temperature. This is desirable because the coffee may be delivered to the aging container immediately upon completion of the roasting operation, in which case the coffee is at a relatively high temperature, or some time after the roasting operation, in which case the coffee may be at or slightly above room temperature.

The fluid supplied by the heated fluid source may be either a liquid or a gas, e.g., water or air.

If the arrangement includes means for controlling the temperature in the aging container, the latter may be double-walled. The aging container then has an inner wall and an outer wall, and these walls are spaced from one another and cooperate to define an annular space around the interior of the container.

According to one embodiment of the invention, the temperature controlling means comprises mean for conveying controlled quantities of fluid from the heated fluid source through the annular space, and means for measuring the temperature of the fluid in the annular space and the temperature of the coffee in the aging container. The conveying means is preferably designed to recirculate at least a portion of the fluid discharged from the annular space.

In accordance with another embodiment of the invention, the temperature controlling means includes a tubular coil which surrounds the interior of the aging container, and means for conveying controlled quantities of fluid from the heated fluid source through the coil. The aging container may here likewise have spaced inner and outer walls which cooperate to define an annular space, and the coil may be disposed in the annular space so as to surround the inner wall. The controlling means further includes means for measuring the temperature of the fluid in the coil and the temperature of the coffee in the aging container. The conveying means is again preferably arranged to recirculate at least a portion of the fluid discharged from the coil.

The temperature controlling means is advantageously designed to maintain the temperature of the coffee in the aging container between 30° and 50° C.

The novel features which are considered as characteristic of the invention are set forth in particular in the appended claims. The improved coffee processing arrangement itself, however, both as to its construction and its mode of operation, together with additional features and advantages thereof, will be best understood upon perusal of the following detailed description of certain specific embodiments with reference to the accompanying drawings.

DESCRIPTION OF THE PREFERRED EMBODIMENTS

Figure 1:
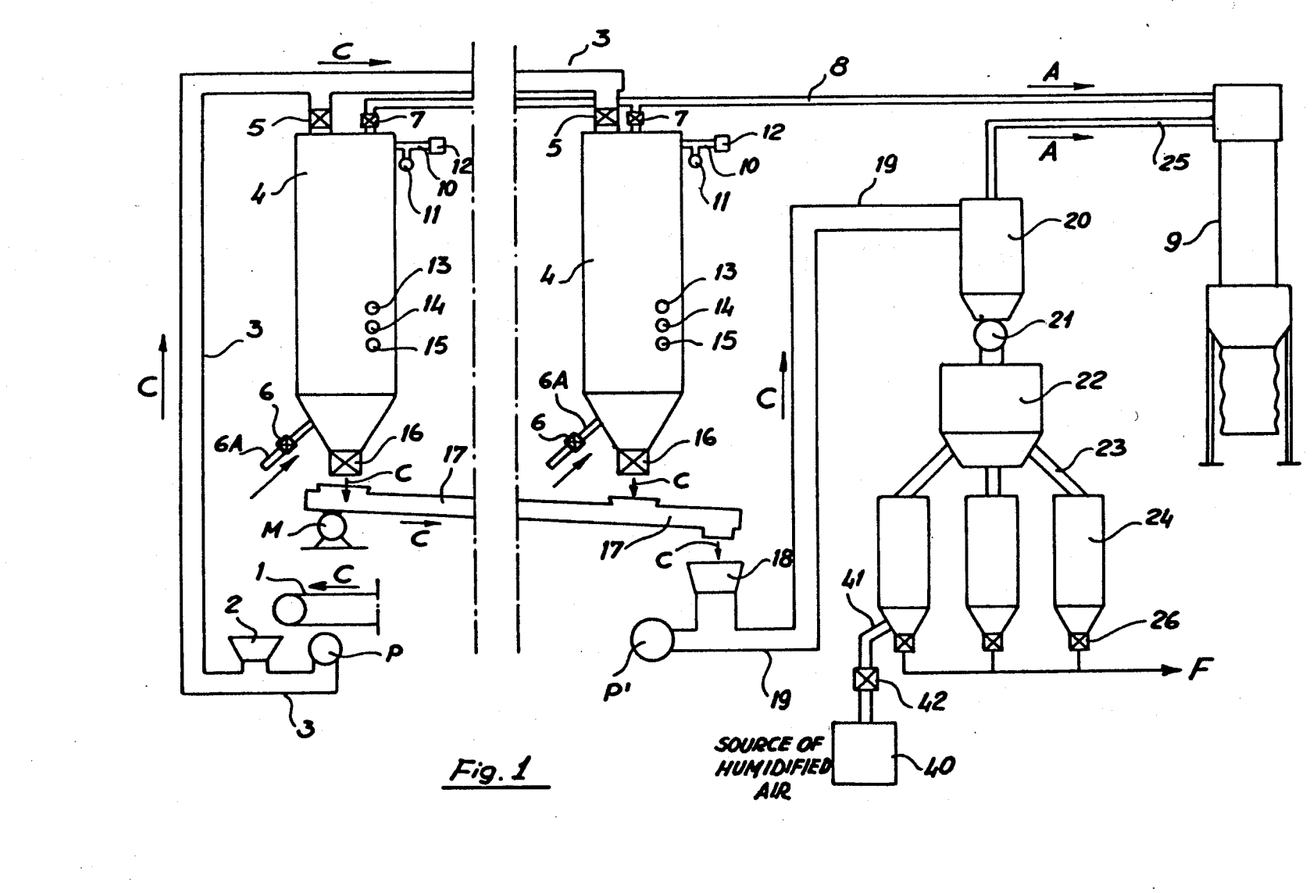
FIG. 1 is a schematic elevational view of one embodiment of a coffee processing arrangement according to the invention.

As shown in FIG. 1 of the accompanying drawings, a conveyor 1 moves freshly roasted coffee beans from a non-illustrated roasting plant to a hopper 2 of a pneumatic conveyor 3. P identifies a pump of the pneumatic conveyor 3. The pneumatic conveyor 3 delivers the coffee beans to a plurality of airtight aging containers 4 having coffee admitting valves 5 which are open during admission of the coffee beans into the aging containers 4. The aging containers 4 further have outlet valves 7 which are likewise open during admission of the coffee beans into the aging containers 4 and permit air to escape from the aging containers 4 as the latter are filled. The aging containers 4, which are in the form of elongated vertical silos, also have gas inlet valves 6, exhaust valves 10, safety valves 11 and coffee discharge valves 16 which are closed while the coffee beans are admitted into the aging containers 4. As the coffee beans enter the aging containers 4, the air brought in with the coffee beans exits through the outlet valves 7 and travels along an air outlet duct 8 to a filter 9. The air is filtered in the filter 9 and then returned to the atmosphere.

When the aging containers 4 are about 90–95% full, the conveyors 1 and 3 stop and the coffee admitting valves 5 and air outlet valves 7 close. The gas inlet valves 6 open and a protective gas which is essentially inert with respect to the aromatic substances in the coffee beans is blown into the aging containers 4 through the valves 6 using known means not shown in FIG. 1. The protective gas, which is preferably $CO_2$ or $N_2$, is obtained from one or more non-illustrated sources of pressurized gas connected to the aging containers 4 by means of ducts or conduits 6A.

Upon starting the streams of protective gas, automatic gas analyzers 12 begin to measure the percentage of $O_2$, e.g., the ratio of $O_2$ to protective gas, in the aging containers 4. Such measurements may be performed continuously or periodically. Once the percentage of $O_2$ is between 0.2 and 1% and, preferably, between 0.4 and 0.5%, e.g., 0.45%, the streams of protective gas are stopped and the pressure in the aging containers 4 is read from pressure gauges 13. If the pressure lies outside the range of 0.4 to 1.8 atmospheres, a pressure within this range is established in the aging containers 4 and aging of the coffee beans begins. Such aging involves a liberation of gas having a high concentration of $CO_2$ from the coffee beans. In the event that the pressure at the start of aging is below 1.0 atmosphere, it tends to spontaneously rise to at least this value. An operator establishes a desired maximum pressure, e.g., 1.2 atmospheres, in the aging containers 4 using the pressure gauges 13.

Aging of the coffee beans takes place at room temperature, i.e., in a temperature range of 20° to 25° C., and lasts for a period of 15 days to 31 days. However, an aging period of 15 to 21 days is preferred. During aging, the pressure in the aging containers 4 is held in the range of 0.4 to 1.8 atmospheres and, preferably, in the range of 1.0 to 1.8 atmospheres. The pressure is controlled by the exhaust valves 10. The $O_2$ concentration in the aging containers 4, which is controlled by the gas analyzers 12, is maintained between 0.2 and 1% throughout the aging period. Advantageously, the $O_2$ concentration is maintained between 0.4 and 0.5%.

The safety valves 11 allow an escape of gas from the aging containers 4 when the internal pressure exceeds a predetermined value. As a rule, the safety valves 11 will be set to open at a pressure between 1.0 and 1.8 atmospheres. For instance, if the maximum desired pressure in the aging containers 4 is 1.2 atmospheres, the safety valves 11 may be set to open at a pressure of 1.3 atmospheres. Diaphragm devices 14 and acoustic alarms 15 are provided and become operative in the event that the safety valves 11 fail. The diaphragm devices 14 cause a rapid evacuation of gas from the aging containers 4.

Upon completion of aging, an operator opens the coffee discharge valves 16 which are disposed at the lower ends of the aging containers 4. The aged coffee beans descend by gravity into a vibratory duct or conveyor 17 which is set in vibration by a motor M. Vibration of the duct 17 causes the coffee beans to spread out along the same and move towards the right as seen in FIG. 1. From the duct 17, the coffee beans fall into a hopper 18 of a pneumatic conveyor 19. P' identifies a pump of the pneumatic conveyor 19. As the coffee beans fall into the hopper 18, the pneumatic conveyor 19 begins operating and introduces the coffee beans into a centrifugal dust separator 20 where air is separated from the coffee beans. The coffee beans thereupon pass through an airtight rotating valve 21 and enter a rotating distributor 22. The rotating distributor 22 distributes the coffee beans among three open stabilization or adjusting containers 24 via distribution ducts 23. A coffee discharge valve 26 is provided at the bottom of each stabilization container 24.

The air separated from the coffee beans in the centrifugal dust separator 20 travels to the filter 9 through a duct or conduit 25.

The aged coffee beans, which are typically very dry, are held in the stabilization containers 24 in order to allow the coffee beans to absorb moisture from the ambient air. The friability of the coffee beans varies with their moisture content, and the absorption of moisture thus stabilizes the coffee beans. The dwell time of the coffee beans in the stabilization containers 24 depends upon the characteristics of the coffee beans as well as the conditions of the air circulating in the stabilization containers 24. The dwell time typically ranges up to a few hours. In order to enhance the absorption of moisture by the coffee beans, a pressurized humidified gas, e.g., air, may be introduced into the stabilization containers 24. This is illustrated in FIG. 1 where a source 40 of pressurized humidified air is connected to one of the stabilization containers 24 by means of a duct or conduit 41 and an inlet valve 42.

Once the moisture content of the coffee beans is in equilibrium with that of the ambient air so that the coffee beans are stabilized, the coffee discharge valves 26 are opened and the coffee beans are evacuated from the stabilization containers 24. The stabilized coffee beans are then transported to a non-illustrated grinding plant as indicated by the arrow F.

The arrows C identify the paths along which the coffee beans travel from the conveyor 1 to the stabilization containers 24. The arrows A indicate the paths followed by the air separated from the coffee beans.

It will be appreciated that the aging containers 4 and the stabilization containers 24 may be in use simultaneously, or that the aging containers 4 may be in use while the stabilization containers 24 are idle, and vice versa.

The aging containers 4 may all be connected with a common source of a pressurized protective gas which is essentially inert with respect to the aromatic substances in the coffee beans or, alternatively, an individual source of such gas may be provided for each of the aging containers 4. Similarly, each stabilization container 24 may be connected to an individual source of pressurized humidified gas or to a common source of pressurized humidified gas.

It is possible for each of the aging containers 4 to be connected to more than one source of a pressurized protective gas which is essentially inert with respect to the aromatic substances in the coffee beans. For example, both a source of pressurized $CO_2$ and a source of pressurized $N_2$ may be connected to each aging container 4 via respective ducts or conduits and respective gas inlet valves.

Figure 2:
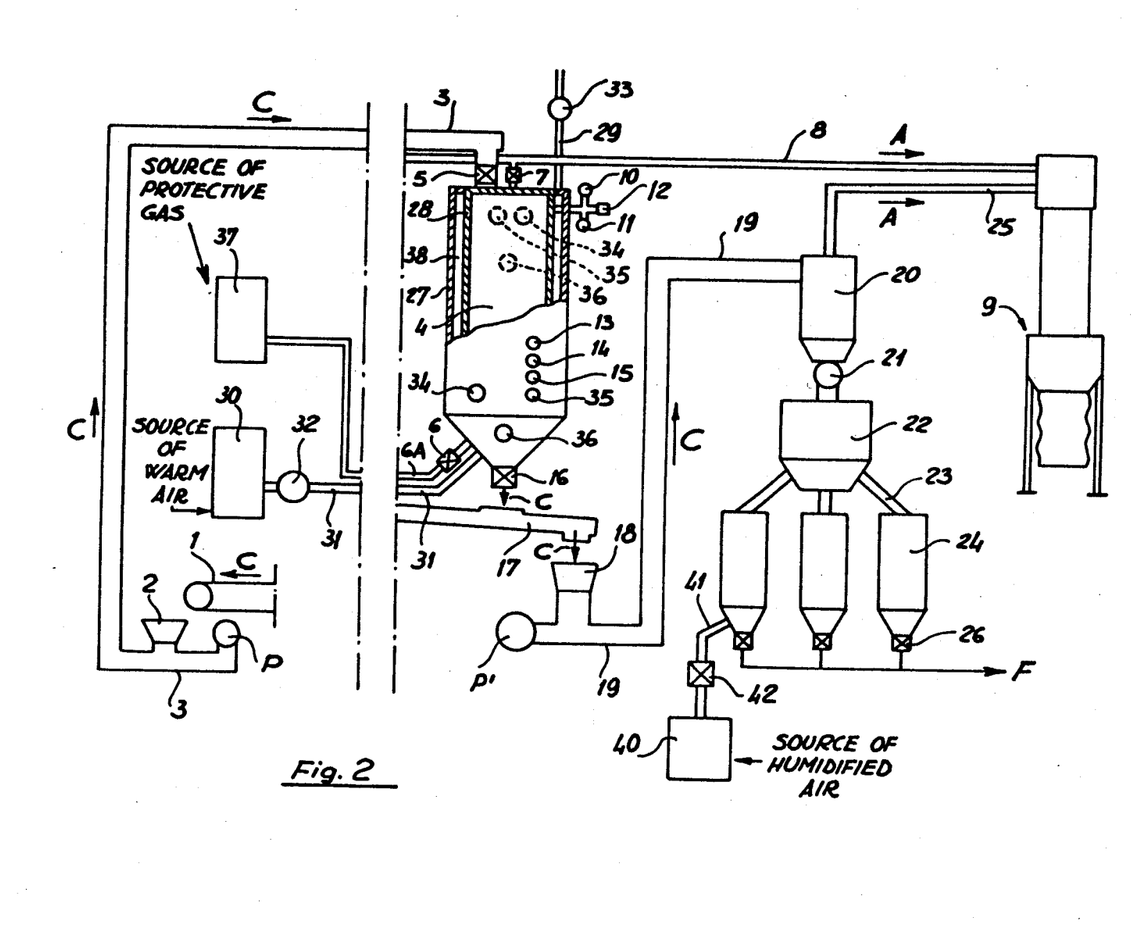
FIG. 2 is similar to FIG. 1 but shows another embodiment of the coffee processing arrangement.

FIG. 2 illustrates another embodiment of a coffee processing arrangement in accordance with the invention. In FIG. 2, the same reference characters as in FIG. 1 have been used to identify similar elements.

The processing arrangement of FIG. 2 differs from that of FIG. 1 primarily in that it comprises means for controlling the temperature of the coffee beans in the aging containers 4.

The aging container 4 shown in FIG. 2 is double-walled and includes an outer wall 27 and an inner wall 28. The walls 27,28 are spaced from one another and cooperate to define an enclosed annular space 38 around the interior of the aging container 4. An outlet duct or conduit 29 provided with an outlet valve 33 communicates with the upper end of the annular space 38. The lower end of the annular space 38 is connected with an inlet duct or conduit 31 which leads to a source 30 of heated gas, e.g., air. A variable-displacement fan 32 is located in the duct 31. The heated gas source 30 is designed to regulate the temperature of the gas delivered thereby.

The aging container 4 is provided with thermometers 34 for measuring the temperature of the gas in the annular space 38, and thermometers 35 for measuring the temperature of the coffee beans in the interior of the aging container 4. The aging container 4 is further provided with thermostats 36 which are designed to regulate the temperature of the coffee beans. To this end, the thermostats 36 are connected to the heated gas source 30 and/or the variable-displacement fan 32 in order to control the operation of the source 30 and/or the fan 32. The thermostats 36 are designed to maintain the temperature of the coffee beans between 30° and 50° C. throughout the aging period.

The reference numeral 37 identifies a source of pressurized protective gas, e.g., $CO_2$ or $N_2$, which is essentially inert with respect to the aromatic substances in the coffee beans.

The operation of the processing arrangement of FIG. 2 differs from that of the arrangement of FIG. 1 essentially only in that the coffee beans are maintained at a temperature above room temperature throughout the aging period, i.e., at a temperature of at least 30° C. and, preferably, no higher than 50° C. Thus, the operation of the processing arrangement of FIG. 2 will not be described in detail but only to the extent that it differs from the operation of the arrangement of FIG. 1.

It is assumed that the pneumatic conveyor 3 of FIG. 2 delivers a supply of coffee beans having a temperature of 30° C. to the aging container 4 and that the coffee beans are to be aged at a temperature of 45° C. It is further assumed that the source 30 delivers heated air to the annular space 38.

As the coffee beans enter the aging container 4, the source 30 is operated so as to supply air having a temperature significantly higher than 45° C. The warm air enters the annular space 38 through the inlet duct 31 and then flows upwards to be discharged from the annular space 38 via the outlet duct 29. The outlet valve 33 controls the quantity of air which leaves the annular space 38 by way of the outlet duct 29. The air flowing through the outlet duct 29 may be discharged to the atmosphere in its entirety. Alternatively, the outlet duct 29 may connect to the inlet duct 31 so that at least a portion of the air leaving the annular space 38 is recirculated. The outlet duct 29 is then preferably joined to the inlet duct 31 at a location between the heated gas source 30 and the fan 32. Recirculation of the air issuing from the annular space 38 allows energy losses to be reduced.

The source 30 continues to generate air at a temperature significantly higher than 45° C. after the aging container 4 has been filled so that the coffee beans are heated to the desired aging temperature of 45° C. without undue delay. Once the temperature of the coffee beans reaches 45° C., the temperature of the air coming from the source 30 is reduced to a value only slightly higher than 45° C. The new air temperature is selected so as to compensate for the heat losses from the inlet duct 31 and the outer wall 27 of the aging container 4 and maintain the temperature of the coffee beans at 45° C. The outer wall 27 may be insulated in order to reduce heat losses.

After 5.5 days in the aging container 4, the coffee beans are discharged from the same. The coffee beans may then be transferred to the stabilization containers 24 without further treatment. Alternatively, the temperature of the coffee beans may be reduced to room temperature during transfer of the coffee beans from the aging container 4 to the stabilization containers 24. This may be accomplished in any known manner. For instance, the coffee beans may be subjected to either natural or forced ventilation while moving along the vibratory duct 17. It is also possible to reduce the temperature of the coffee beans by blowing air at room temperature into the pneumatic conveyor 19.

Instead of immediately discharging the coffee beans from the aging container 4 at the end of the dwell period of 5.5 days, the temperature of the coffee beans may be reduced to room temperature while the coffee beans are still in the aging container 4. This may be accomplished by blowing air at room temperature through the aging container 4. Once the coffee beans are at room temperature, the coffee beans are discharged from the aging container 4 and transferred to the stabilization containers 24.

A fresh batch of roasted coffee beans may be delivered to the aging container 4 upon removal of the aged coffee beans therefrom.

Figure 3:
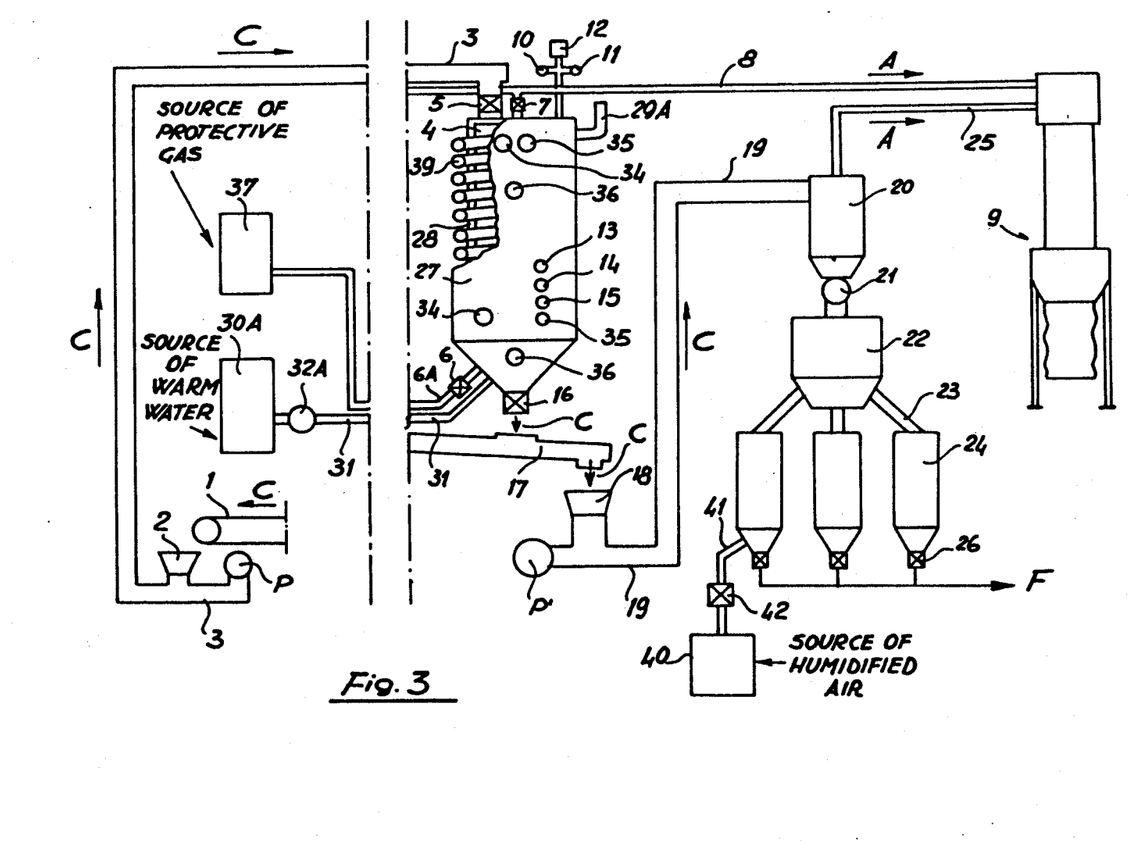
FIG. 3 is similar to FIGS. 1 and 2 but illustrates an additional embodiment of the coffee processing arrangement.

FIG. 3 illustrates an additional embodiment of a coffee processing arrangement according to the invention. The processing arrangement of FIG. 3 differs from that of FIG. 2 in the means for heating the coffee beans in the aging container 4 but is otherwise identical to the arrangement of FIG. 2. In FIG. 3, the same reference characters as in FIG. 2 are used to identify the same elements.

The processing arrangement of FIG. 3 includes a tubular heating coil 39 which is disposed in the annular space between the inner and outer walls 28,27 of the aging container 4 and surrounds the inner wall 28. The lower end of the coil 39 is connected with a source 30A of heated liquid, e.g., water, by way of the inlet conduit 31. A variable-displacement pump 32A is located in the inlet conduit 31 and serves to convey heated liquid from the source 30A through the coil 39. The source 30A is designed to regulate the temperature of the liquid delivered thereby.

The thermostats 36, which regulate the temperature of the coffee beans in the aging container 4, are connected to the heated liquid source 30A and/or the variable-displacement pump 32A in order to control the operation of the source 30A and/or the pump 32A in dependence upon the temperature of the coffee beans. The thermostats are again designed to maintain the temperature of the coffee beans between 30° and 50° C. throughout the aging period.

The upper end of the heating coil 39 has an extension 29A through which liquid from the source 30A is discharged from the coil 39 after transferring heat to the coffee beans in the aging container 4. The extension 29A may connect to the inlet conduit 31 in order to permit recirculation of at least a portion of the liquid issuing from the coil 39.

The processing arrangement of FIG. 3 operates analogously to that of FIG. 2.

The $O_2$ concentration in the aging container 4 of FIGS. 2 or 3 is maintained within the range of 0.2 to 2% throughout the aging period. Furthermore, due to the fact that the coffee beans are kept at a temperature above room temperature, i.e., a temperature of at least 30° C., during aging, the aging period when using the processing arrangement of FIGS. 2 or 3 is shorter than that for the processing arrangement of FIG. 1. For aging temperatures between 30° and 50° C., the aging period may range from 4 to 10 days. The aging period may be inversely proportional to the aging temperature. Thus, the aging period is preferably 10 days at an aging temperature of 30° C.; 7 days at an aging temperature of 40° C.; and 4 days at an aging temperature of 50° C.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of my contribution to the art and, therefore such adaptations should and are intended to be comprehended within the meaning and range of equivalence of the appended claims.

I claim:

1. A process for treating roasted coffee, comprising the steps of admitting roasted coffee beans into at least one aging chamber; establishing an $O_2$ concentration of between about 0.2 and about 2% in said chamber; and thereafter aging the coffee beans in said chamber at a temperature of about 20°-50° C. for a period of about 4 days to about 4 months, the aging step including establishing and at least substantially continuously maintaining in said chamber a pressure of less than about 1.8 atmospheres throughout at least a major part of said period, measuring and continuously maintaining the $O_2$ concentration in said chamber between about 0.2 and about 2% throughout at least a major part of said period and adjusting the $O_2$ concentration when the $O_2$ concentration lies outside the range of about 0.2 to about 2%.

2. The process of claim 1, wherein the step of establishing said $O_2$ concentration comprises introducing into said chamber at least one protective gas which is substantially inert with respect to the armoatic substances in the coffee.

3. The process of claim 2, wherein the step of establishing said $O_2$ concentrations comprises introducing into said chamber at least one gas selected from the group consisting of $CO_2$ and $N_2$.

4. The process of claim 3, wherein the step of establishing said $O_2$ concentration comprises introducing $CO_2$ into said chamber, and subsequently introducing $N_2$ into said chamber.

5. The process of claim 1, wherein said measuring is performed periodically.

6. The process of claim 1 wherein the step of establishing said $O_2$ concentration comprises introducing into said chamber at least one protective gas which is substantially inert with respect to the aromatic substances in the coffee, said measuring step including ascertaining the ratio of $O_2$ to said gas.

7. The process of claim 1, wherein the step of establishing said $O_2$ concentration comprises establishing a pressure between about 0.4 and about 1.8 atmospheres in said chamber, the aging step including maintaining the pressure in said chamber between about 0.4 and about 1.8 atmospheres throughout an initial part of said period.

8. The process of claim 7, wherein the aging step includes maintaining the pressure in said chamber between about 1 and about 1.8 atmospheres throughout another part of said period.

9. The process of claim 1, wherein said chamber is substantially airtight.

10. The process of claim 1, wherein the aging step includes substantially continuously maintaining said chamber at room temperature throughout at least the major part of said period.

11. The process of claim 10, wherein said period is between about 15 days and about 31 days.

12. The process of claim 11, wherein said period is between about 15 days and about 21 days.

13. The process of claim 10, wherein the aging step includes maintaining the $O_2$ concentration in said chamber between about 0.2 and about 1% throughout at least the major part of said period.

14. The process of claim 13, wherein the aging step includes maintaining the $O_2$ concentration in said chamber between about 0.4 and about 0.5% throughout at least the major part of said period.

15. The process of claim 1, wherein the aging step includes maintaining a temperature of at least 30° C. in said chamber throughout at least the major part of said period.

16. The process of claim 15, wherein the aging step includes maintaining a temperature of at most about 50° C. in said chamber throughout at least the major part of said period.

17. The process of claim 15, wherein said period is between about 4 and about 10 days.

18. The process of claim 15, wherein the aging step includes maintaining a temperature of approximately 30° C. in said chamber throughout at least the major part of said period and said period is about 10 days.

19. The process of claim 15, wherein the aging step includes maintaining a temperature of approximately 50° C. in said chamber throughout at least the major part of said period and said period is about 4 days.

20. The process of claim 15, wherein the aging step includes maintaining a temperature of approximately 40° C. in said chamber throughout at least the major part of said period and said period is about 7 days.

21. The process of claim 1, further comprising the step of adding moisture to the coffee subsequent to the aging step.

22. The process of claim 21, further comprising the step of admitting the coffee into an adjusting chamber subsequent to the aging step; and wherein the step of adding moisture comprises introducing humidified air into said adjusting chamber.

23. The process of claim 21, wherein the step of adding moisture comprises exposing the coffee to ambient air.

* * * * *